(12) United States Patent
Schalk et al.

(10) Patent No.: US 7,219,063 B2
(45) Date of Patent: May 15, 2007

(54) WIRELESSLY DELIVERED OWNER'S MANUAL

(75) Inventors: Thomas Barton Schalk, Plano, TX (US); Steve Alan Millstein, Dallas, TX (US)

(73) Assignee: ATX Technologies, Inc., Irving, TX (US)

( * ) Notice: Subject to any disclaimer, the term of this patent is extended or adjusted under 35 U.S.C. 154(b) by 204 days.

(21) Appl. No.: 10/992,025

(22) Filed: Nov. 18, 2004

(65) Prior Publication Data

US 2005/0108249 A1    May 19, 2005

Related U.S. Application Data

(60) Provisional application No. 60/523,364, filed on Nov. 19, 2003.

(51) Int. Cl.
*G10L 21/00* (2006.01)
(52) U.S. Cl. .................. 704/270.1; 704/270; 704/275; 704/201; 701/301; 701/207; 340/988; 455/414.1
(58) Field of Classification Search ............ 704/270.1, 704/270, 275, 201; 701/301, 207; 340/988; 455/414.1
See application file for complete search history.

(56) References Cited

U.S. PATENT DOCUMENTS

| | | | | |
|---|---|---|---|---|
| 5,396,540 A | * | 3/1995 | Gooch .................... | 455/456.3 |
| 5,572,204 A | * | 11/1996 | Timm et al. ............... | 340/988 |
| 5,812,934 A | * | 9/1998 | Hard et al. ................ | 340/7.58 |
| 6,076,028 A | * | 6/2000 | Donnelly et al. ............ | 701/45 |
| 6,128,482 A | * | 10/2000 | Nixon et al. ............. | 455/414.1 |
| 6,167,255 A | * | 12/2000 | Kennedy et al. ......... | 455/414.1 |
| 6,697,894 B1 | * | 2/2004 | Mitchell et al. .............. | 710/73 |
| 6,741,172 B1 | * | 5/2004 | Hamrick et al. ........... | 340/514 |
| 6,993,421 B2 | * | 1/2006 | Pillar et al. ................... | 701/33 |
| 2005/0187675 A1 | * | 8/2005 | Schofield et al. ............. | 701/2 |

* cited by examiner

*Primary Examiner*—Vijay Chawan
(74) *Attorney, Agent, or Firm*—Mayback & Hoffman, P.A.; Gregory L. Mayback; Scott D. Smiley

(57) ABSTRACT

This invention is directed to a method of delivering vehicle owner's manual or other vehicle-specific information to the vehicle operator from a remote data center and associated vehicle information database by utilizing a voice recognition system at the remote data center and delivering the information to the vehicle operator in audible speech. The vehicle operator speaks his request in the vehicle and the data center recognizes the request, perhaps asks more questions, leads the vehicle operator through a spoken menu, and then provides the answer vocally to the vehicle operator over the speaker(s) located in the vehicle. The invention includes methodology for obtaining vehicle diagnostic information and controlling certain vehicle functions automatically via an embedded telematics control unit. The invention further includes remote telephone access outside the vehicle.

15 Claims, 4 Drawing Sheets

WIRELESSLY DELIVERED OWNER'S MANUAL

CROSS REFERENCE TO RELATED APPLICATION

This application claims priority of Provisional Application Ser. No. 60/523,364 filed Nov. 19, 2003.

FIELD OF INVENTION

The present invention pertains to a method of delivering vehicle owner's manual information wirelessly to the vehicle operator. More particularly, the present invention pertains to a method of detecting vehicle operator requests by use of an automated voice recognition system at a remote data center (DC) and delivering the requested information wirelessly to the operator of that vehicle. The vehicle operator hears voice recordings that relate to the requested information. A voice user interface is utilized to request and manage the vehicle owner's manual information.

BACKGROUND OF INVENTION

As consumer vehicles such as cars and trucks become more complicated, operation of that vehicle becomes less intuitive. Owners become frustrated with traditional owner's manuals that are typically printed matter in a booklet form, some form of electronic archival media viewable with a computer or like device, or some form of audio-video presentation. This frustration typically results from an inability to find the answers to the questions posed. Typically the information is needed while operating the vehicle during times when access to the traditional owner's manuals described above is impossible, or at least unsafe. For instance, attempting to learn how to re-set the time on the digital clock integrated with the audio system on the dashboard often requires a vehicle owner to survey a range of potential terms to describe the situation—clock, time, audio system, CD-audio system. Figuring out how to make the cruise control work, while driving, is another example.

Today there is such an array of devices in trucks and cars that driver distraction is a major problem. Manipulating controls is enough of a problem without having to try to read a book while driving. Even with the advent of Telematics systems in vehicles today there is not currently a service that is deployed which would solve the above-described problems. Thus, it would be a significant advancement in the art to provide a menu-driven, automatic voice recognition system at a remote data center that would deliver vehicle operator-requested information from a database over a wireless link to the vehicle operator in a hands-free environment. The primary advantages of the remote data center are flexibility and cost effectiveness. Because the platform is off-board, the application can easily be modified without changing any in-vehicle hardware, or software. Such flexibility allows for user personalization and application bundling, in which a number of different applications are accessible through a voice main menu. In terms of cost, server-based voice recognition resources can be shared across a large spectrum of different vehicles. For example, 48 channels of server-based voice recognition can accommodate over a thousand vehicles simultaneously.

SUMMARY OF INVENTION

Accordingly, the present invention is directed to a system and a method of delivering vehicle operator-requested information from a remote data center database over a wireless link. The information delivered would be in response to voice-recognized menu selections made by the operator of the vehicle. The voice recognition system would be located at the remote data center. The information delivered would be extracted from the database and delivered verbally to the operator of the vehicle. For vehicles with embedded telematics, diagnostic activity such as explaining the cause for a warning light to flash, or actually setting the clock to the correct time, are both examples of possible interactive scenarios. The user could ask about a flashing warning light, or ask the system to set the clock, rather than how to set the clock.

Wireless delivery of owner's manual information also helps automobile manufacturers and dealerships promote a vehicle's value-added features that often go unnoticed and unused by its owner. What could often be time-consuming for dealers to explain, and vehicle owners to absorb, is now conveniently accessible to vehicle owners via voice-operation when they have time or when needed. Content of the e-owners manual also can be modified to highlight features the automobile manufacturer would like to promote or customized to respond to questions pertaining to specific models or model lines. The diagnostic capabilities of embedded telematics control units make vehicle service reminding very practical. An owner could access the e-owner's manual for any reason and be reminded that service should be scheduled with his dealer.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–5 of the drawings, in which like numbers designate like parts.

Figure 1:
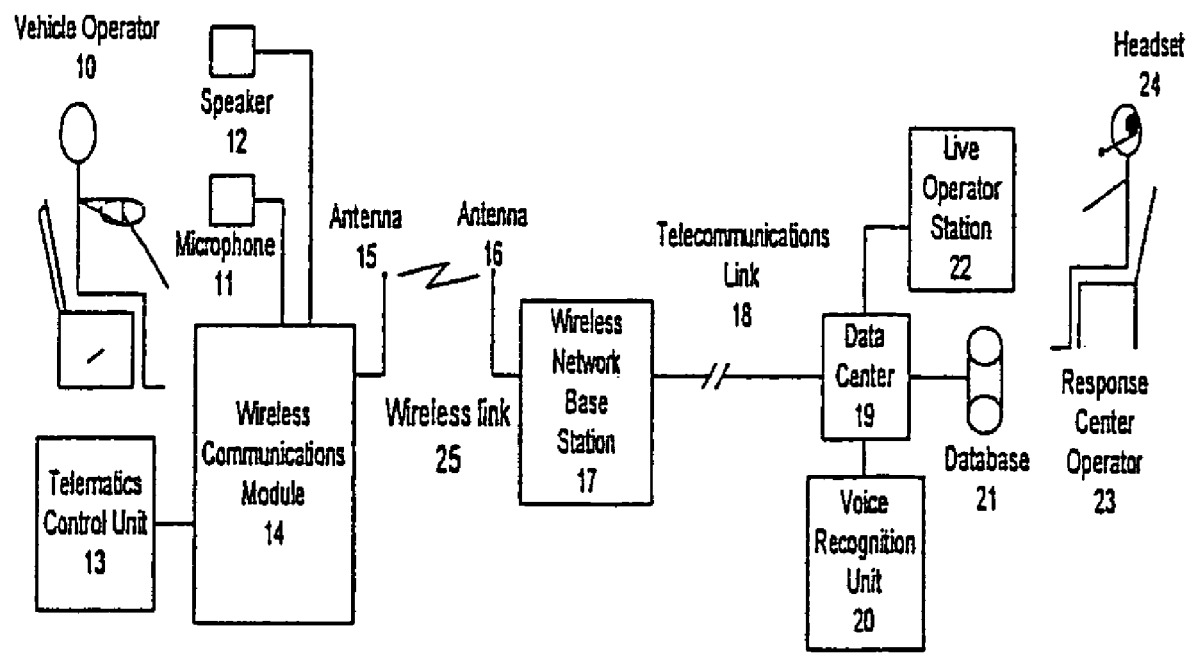
FIG. 1 is a schematic block diagram of the complete system required to deliver owner's manual information from a database 21 located at a remote site to the vehicle operator 10.

Referring to FIG. 1, when the vehicle operator 10 desires information about the vehicle, a wireless communications link is initiated to the remote data center 19. This could be accomplished in a number of ways such as a spoken command in the vehicle or pressing a button. Communication is established and the vehicle operator 10 speaks a command into the hands-free microphone 11 located in proximity to the vehicle operator 10. The vehicle operator's spoken command passes over the wireless link 25 through the vehicle mounted wireless communication module 14, through the vehicle mounted wireless antenna 15, through the wireless network's antenna 16 and wireless network base station 17, through one of many telecommunications networks 18, and into the data center 19. From there the voice recognition unit 20 interprets the spoken command(s). The data center 19 then reviews the results of the voice recognition unit's interpretation of the spoken command(s) and either provides the requested information from the database 21, asks a question, or provides a menu of options. This response to the vehicle operator is converted into speech and delivered back to the vehicle operator 10 over the same wireless link 25. The speech audio is directed to the vehicle speaker(s) 12 in a hands-free environment. The vehicle operator 10 can then select a menu item, request clarification, abort the thread, or command the system to perform any number of tasks. The recognized command and the delivered responses actually comprise a dialog between the vehicle operator 10 and the data center 19. All manner of information can be delivered to the vehicle operator 10 in this manner.

Referring to FIG. 1, when the vehicle operator 10 desires information about the vehicle and the wireless communications link is initiated to the remote data center 19, diagnostic information from the telematics control unit 13, embedded within the vehicle, is transmitted to the remote data center 19. The specific considerations in developing telematics-based systems are discussed in detail below. Examples of relevant diagnostic information include engine warning light information, vehicle mileage, and vehicle speed. The off-board application is capable of explaining vehicle condition and needs, such as the need to schedule maintenance. The off-board application can also request that the vehicle remain stationary while the vehicle operator performs certain functions that may cause driver distraction (e.g., the car should be stationary while setting the clock). Furthermore, the intelligence of the embedded telematics control unit 13 may allow for automated clock setting, in which the vehicle operator requests that the clock be set automatically, without the delivery of detailed speech audio instructions that would otherwise be generated from the remote data center 19.

In some instances the vehicle operator 10 may want to speak to a live operator. This connection is initiated with a spoken command. The data center then routes the communications link to a live operator station 22. There a response center operator 23 can communicate with the vehicle operator 10 usually through a vocal headset 24. The response center operator 23 can then provide whatever services the vehicle operator 10 requests. The response operator may have access to the vehicle diagnostic information generated from the telematics control unit 13.

Figure 2:
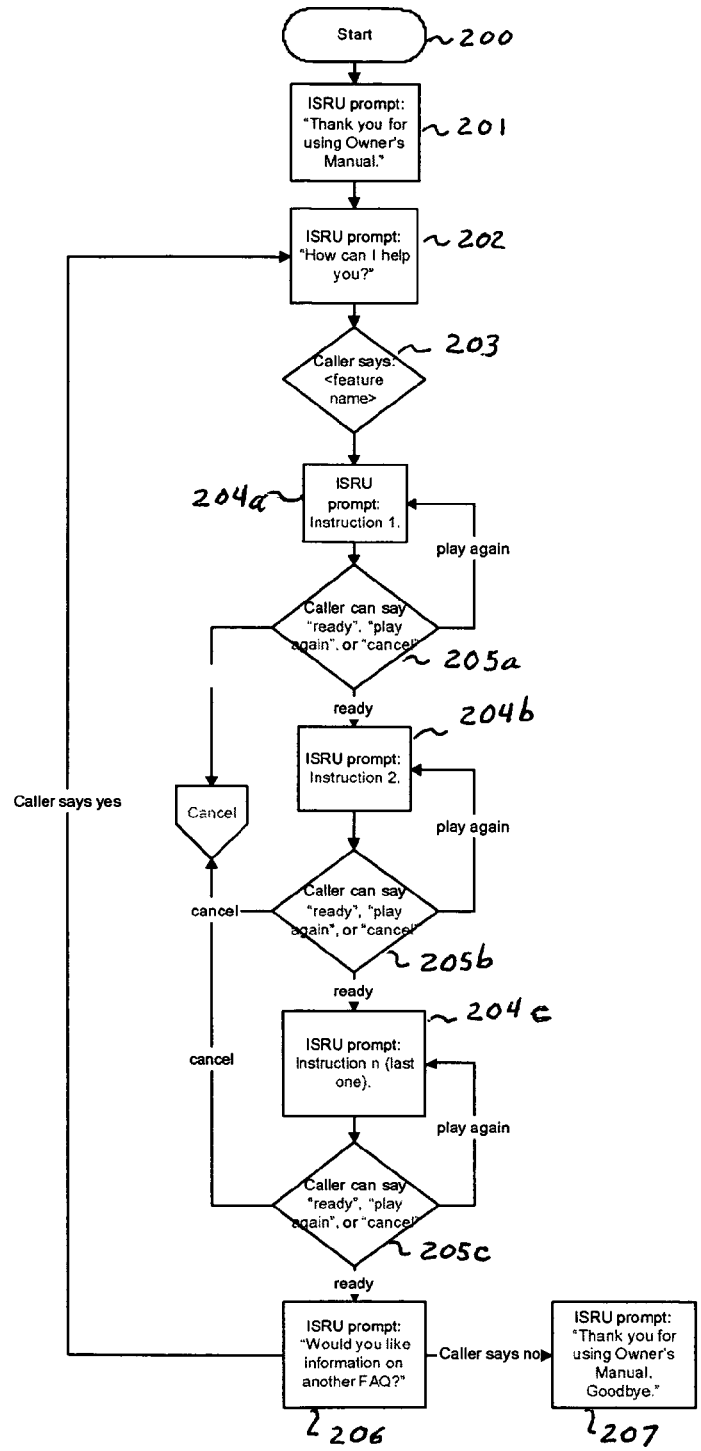
FIG. 2 is a flow chart of a procedure 200 illustrating a typical application of the system shown in FIG. 1.

FIG. 2 is a flow chart of a procedure 200 illustrating a typical application of a wirelessly delivered user manual according to the present invention. On system initialization at Block 201, the vehicle operator 10 (i.e. the caller) receives an initial greeting, such as "Thank you for using owner's manual" from data center 19 through an on-board Interactive Speech Response Unit (ISRU), collectively wireless communications module 14, telematics control unit 13, microphone 11, and speaker 12. At Block 202, data center 19 prompts vehicle operator 10, through the ISRU, to request the desired user manual information. A typical prompt can be, for example, "How can I help you?"

Vehicle operator 10 makes his or her selection vocally at decision block 203. Typical information available in the active grammar can include, for example, information on such features as seat adjustment, headlamps, mirrors, climate control, cruise control, radio, warning lights, and so on.

Once the vehicle operator 10 vocally makes a selection, data center 19 issues the first requested instruction or information from the user manual grammar through the ISRU at block 204*a*. Vehicle operator 10 is then given the opportunity, at decision block 205*a*, to request playback of the first instruction provided at block 204*a*, indicate that vehicle operator 10 is ready to receive further instructions, if any, or cancel the remainder of procedure 200 entirely.

If vehicle operator 10 states that he or she is ready to receive additional instructions, the dialog continues with similar request and answer steps at blocks 204*b* and 205*b*, for a second instruction. This process repeats n—number of times, until all n—number of instructions requested by vehicle operator 10 have been conveyed. For reference, two additional blocks 204*c* and 205*c* are shown in FIG. 2, although the number of iterations of blocks 204 and 205 will vary in actual applications, depending on the amount of instructions requested by vehicle operation 10.

When the last instruction requested by vehicle operator 19 is conveyed, at block 205*c* in the example of FIG. 2, data center 19 sends another prompt at block 206, for example, "Would you like information on another feature?" If vehicle operator 10 says yes, then procedure 200 returns to block 202 and repeats for a new feature of interest of the vehicle. Otherwise, at block 207, data center 19 provides closing dialog, for example, "Thank you for using owner's manual. Goodbye."

Telematics refers to "vehicle-centric services often based on location." Voice telematics is defined as the integration of telematics and interactive voice technology. The basic concept is to use an audio interface to command the performance of tasks while driving. For example, a driver or passenger simply pushes a button and the system prompts to a spoken command such as "traffic update" or "connect me to my dealer." Advantageously, driver distraction is minimized because the driver's eyes can be kept on the road. A few applications of voice automation in the vehicle include: obtaining traffic reports, receiving driving directions, personal voice dialing, climate and radio control, obtaining vehicle service reminders, info-service call routing, as well as the interactive owner's manuals discussed above.

In applying telematics, a number of benchmarks must be considered, including: (1) robust hands-free voice recognition accuracy—95%; (2) proliferation of "thin-client" vehicles with off-board voice automation; (3) convergence of embedded and off-board voice solutions; (4) personalized user interfaces that adapt to the user's needs; (5) consistent, easy-to-use interfaces to minimize driver distraction; (6) low latency user experiences; (7) complete voice automated traffic and navigation (turn-by-turn); and (8) open standards architecture with multi-lingual support The ultimate goal is to provide interactive voice recognition applications that approach human-to-human interaction. Notwithstanding, the hands-free automotive environment is a very noisy, and the voice recognition technology must be optimized as much as possible. This problem presents some significant challenges.

In an effort to achieve human-like interaction, a number of strategies must be implemented. The most important strategy involves analyzing audio recordings of real user experiences. Once an application is deployed, usability studies are leveraged to improve the performance of the application, making it easier to use and more reliable. The efforts to reach the 95% accuracy target include optimizing acoustic models, grammars, prompts, and various voice technology parameters.

There are a number of components common to any automatic speech recognition (ASR) system including acoustic models, grammars, and dictionaries. Put simply, acoustic models represent "how" speech sounds in the target environment, grammars represent "what" can be recognized during an application, and dictionaries represent the "way" words are to be pronounced.

For any given ASR technology, grammars and acoustic models must be optimized with the goal of reaching 95% accuracy. As a general rule, if humans can understand a command or a structured utterance, then a properly tuned ASR system should recognize it. There are no applications that are acceptable if the accuracy is low. Thus, the best way to improve accuracy is to use real-world recordings to improve and test acoustic models and grammars. Other parameters that deal with such things as speech end-pointing, barge-in, confidence thresholds, timeouts, and buffer sizing can also be optimized to improve accuracy.

ASR systems can be speaker-dependent or speaker-independent. Speaker—dependent systems require user training to create a working vocabulary, whereas speaker—independent ARS systems require no user training. All ASR systems base recognition on some form of matching spoken input to target vocabularies. Acoustic models, grammars, and dictionaries (also called lexicons) are three components of an ASR system that are critical to recognition accuracy. Once the acoustic models are developed, grammars are enhanced frequently as application performance is improved. Strategies for enhancing grammars are based on usability analysis which informs the dialogue designer what people really say during application usage.

Figure 3:
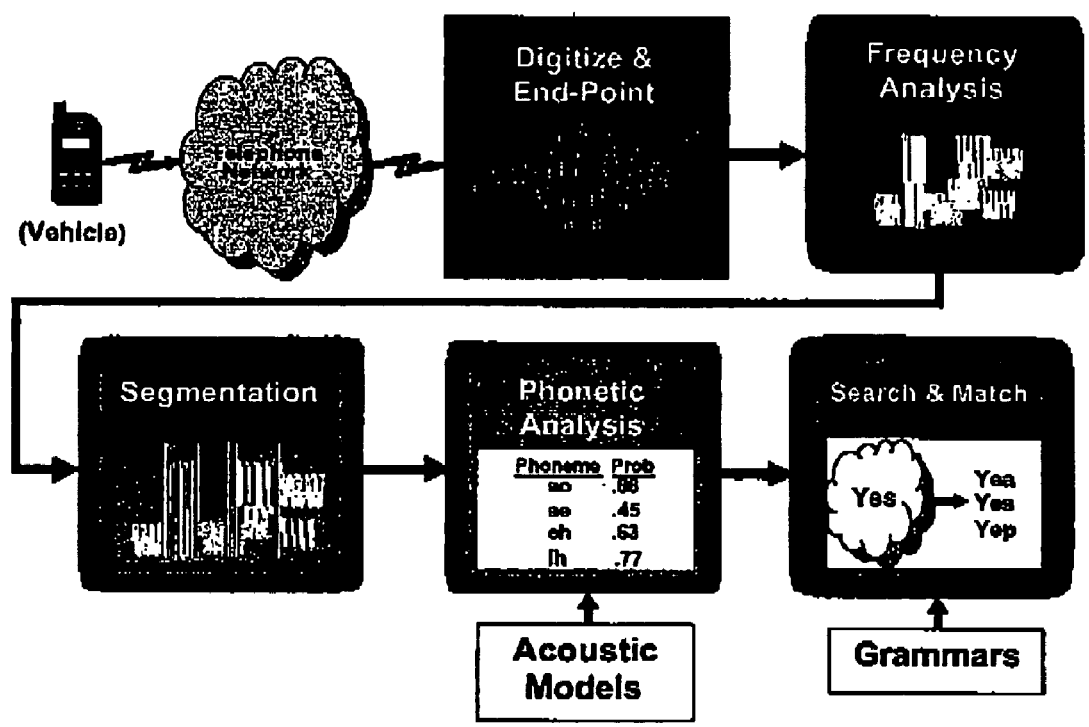
FIG. 3 is a conceptual diagram of a typical automatic speech (voice) recognition system.

FIG. 3 is a conceptual diagram which illustrates various ASR (voice recognition) components, and in particular, acoustic models and grammars. In a typical off-board telematics application, the user pushes a button that initiates communication between the vehicle and the call center where the recognition server resides. A "how may I help you" prompt is played inside the vehicle and the user may respond by saying "traffic please." The speech is transmitted as voice data to the call center where the speech processing begins. First, the utterance is captured and digitized if needed. Then, spectral analysis occurs and the speech is automatically segmented into its various phonetic units (analogous to pronunciations found in common dictionaries). The phonetic units are matched against the acoustic models and classified accordingly. Grammar analysis typically results in the identification of what was spoken with an associated probability of being correct (low probabilities imply that something is out-of-grammar.

Acoustic models are statistical representations of phonetic sounds that are produced under specific environmental conditions. Phonetic sounds can be thought of as sub-units of spoken words to be recognized by an ASR system. The environmental conditions are characterized by numerous components, including: the microphone type and its placement, the surrounding acoustic media, audio transmission properties, background noise, signal conditioning software, and anything that influences the quality of the sound that the ASR system processes. Acoustic models are critical for high accuracy speech recognition, and in reality, accuracy can only be achieved with highly tuned acoustic models. Speech data collections form the basis of acoustic models. Typically, thousands of recordings that represent environmental extremes of a target ASR environment constitute a "good" speech data base.

Grammars are a set of rules that define the set of words and phrases (a vocabulary) that may be recognized during voice applications. Typical applications have several grammars such as yes/no, digits, street names, menu items, and so forth. Only the necessary vocabulary is active at any point of an application call flow, to maximize accuracy. For example, digits wouldn't be recognized during a yes/no query unless there is a special reason (not to mention that "oh" might be confused with "no"). Grammars that contain too many short words usually exhibit low accuracy because short words are more difficult to recognize than long, multi-syllabic words. As a rule, the longer the word, the more phonetic content available for distinguishing it from other words. An example of a tough vocabulary is the alphabet in which you have short sounds that rhyme with one another.

Grammars rely on dictionaries for pronunciation information. Dictionaries are commonly referred to as lexicons. A lexicon is a collection of words and their associated pronunciations in terms of phonetic transcriptions. Much like a common dictionary, pronunciation is specified by a standard symbol set.

Voice applications should be designed to accept common speech responses from typical users. Multiple ways of "saying the same thing" must be properly represented in the recognition grammars and associated lexicons. The key is to identify the words (or meanings) that may be spoken in more than one way. For navigation applications, street names are often pronounced in different ways (e.g., Rodeo Drive) or even referred to by totally different names (LJB Freeway versus 635).

To handle pronunciation variation, one must apply linguistics knowledge to predict likely pronunciations, and then generate the corresponding phonetic transcriptions to be stored in a lexicon. The application needs to translate what was recognized into a specific meaning (different words, or multiple pronunciations would map into the same meaning). As a simple analogy, when a yes/no question is asked, the user may "mean" yes by saying "yes", "yep", "ok", "sure", and so forth. The application interprets each response as meaning yes. For street names, "LBJ Freeway" and "635" would both be contained in the grammar and would have the same meaning in the application.

Recognition accuracy is highly dependent on the size and difficulty of the recognition grammars. Grammar requirements need to be fully understood before reliable estimates of accuracy can be made. For voice telematics, directed dialogues are usually used to encourage simple, easy-to-recognize responses from the user. For difficult recognition tasks, such as automated directory assistance, it may be practical to utilize spelling as part of the recognition strategy. In addition, confidence measures should be incorporated to determine the need for spelling (or repeating) on a per recognition basis.

For cases in which an utterance cannot be recognized automatically (i.e., after all application strategies fail, including spelling), the call is usually handed over to live operator. Of course, operator hand-off is a design issue that only applies to off-board voice solutions. Interestingly, an unrecognized utterance could be listened to and understood by an operator without the caller knowing it, much like directory assistance applications. On the other hand, an entire call could be handed over to a live operator for the few cases in which voice automation is not practical.

Voice automation in the vehicle can be achieved in a number of different ways. The two primary architectures for voice automation are referred to as embedded solutions and off-board solutions. Embedded is the case where all components of the application and speech technology reside within the vehicle. Off-board is the case where audio from the car is transmitted to a server located in a call center. There are hybrid solutions in which embedded systems are integrated with off-board systems. Additionally, there are distributed solutions where the recognizer is split so that back-end recognition processing takes place off board.

Figure 4:
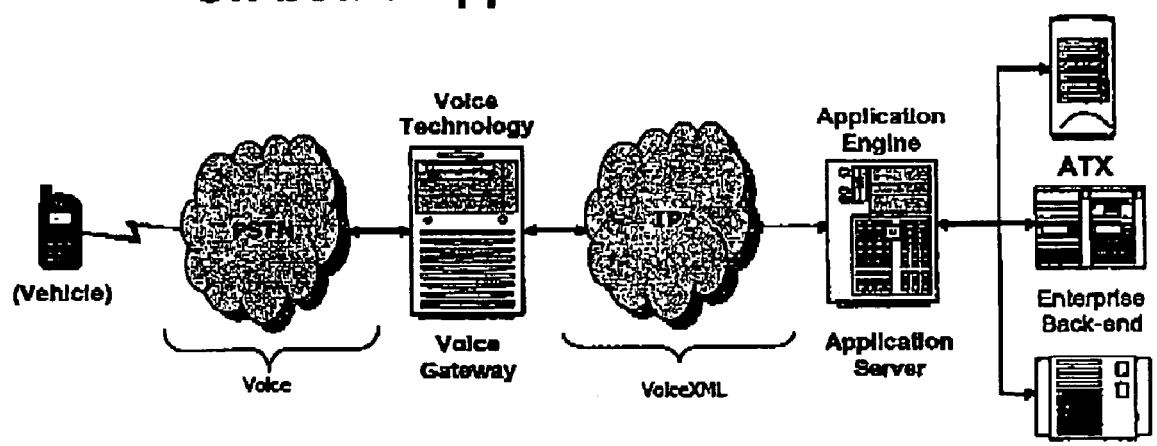
FIG. 4 is a conceptual diagram of an exemplary off-board voice recognition system.

FIG. 4 is a conceptual diagram illustrating the modular nature of off-board voice application architectures. The communication device (e.g. a cell phone/modem) is located within the vehicle and is often configured in a hands-free microphone arrangement. The audio is transmitted over the public switched telephone network (PSTN) and received within a call center via telephony interface cards, a main component of what is referred to as a Voice Gateway. Automatic speech recognition (ASR), text-to-speech (TTS), and the voice browser constitute the other components of the Voice Gateway. The voice browser interfaces (via the internet) with the application server through VoiceXML. The application generates VoiceXML pages dynamically and handles the back-end data integration and processing.

The advantages of an off-board voice solution are numerous, but for telematics, the cost effectiveness of the so-called "thin-client" offering is by far most significant. Other advantages include flexibility, maintainability, and scalability. Disadvantages of an off-board voice solution include inconsistent audio quality and system latency. However, if the audio to be recognized is reasonably intelligible to a human, then a properly designed recognizer will perform adequately. There are two sources for application latency: connect setup time and delay during the dialogue. Both must be managed very carefully.

Perhaps the most fundamental challenge in voice telematics is to evolve applications into a personalized experience for the user by adapting the application to the user's needs. Applications where repeat callers are expected (and desired) can be designed so that prompts become shorter over time and the menu selections become structured to reflect user preferences.

However, there is no guarantee that a new user (a spouse, for example) will not begin using an application that has already adapted to another user. In some cases the application can be configured by voice to operate in an expert mode as opposed to adapting to user behavior automatically. The possibilities span a wide range and strategies are still being evaluated. In theory, the application could detect the experienced user through a voice-print analysis, but application complexity and maintenance become new issues. The option of using a spoken password is another possibility.

The novice user has different needs than the experienced user. The goal is to adapt the dialogue experience to match the user's needs. Starting out, the user should receive complete, detailed prompts with multiple easy ways to ask for help. As the user becomes more experienced, the prompts should become tailored to the user's preferences, shorter, and perhaps incorporate barge-in (the ability to speak over prompts) as a feature where needed. It's been observed that repeat users have higher success rates simply because the repeat callers know how to use the system (and they won't call back if the system doesn't work well for them).

For small menus, where there are a limited number of choices, one can develop grammars that are robust, even for conversational responses. However, for large active vocabularies such as POIs and street names, accuracy is severely sacrificed at the expense of achieving user input flexibility (designing for conversational responses). For large grammar sizes, the user should say only what needs to be recognized. Hence, dialogue design is critical and the prompts should lead the user. A dialogue design in which the main menu accepts conversational responses is practical, as long as the grammar is based on a collection of "real-world" responses to well-designed prompts.

For navigation applications, the whole issue of conversational user interfaces becomes challenged by the well-proven human factors principle of consistency. That is, the application must be consistent, and, for example, if a user can't be conversational during street name entry, then why should the user expect to be conversational during menu selection? Even in non-automotive environments such as "normal" telephony applications, conversational statements are rarely recognized with high accuracy when the active vocabulary is difficult (i.e., of high perplexity). Audio recordings to facilitate usability assessment should be used to define better grammars, which will in some cases, include conversational statements (e.g., "please repeat that driving direction for me").

To summarize, the dialogue design needs to encourage simple responses from the user. The user experience must be intuitive and easy thereby minimizing driver distraction. Conversational statements should be recognized during the application, when necessary. Usability studies identify areas where conversational grammars are required.

For voice telematics to be successful, recognition accuracy must be high for both embedded and off-board solutions. Embedded solutions are "thin" on processing which makes accuracy a challenge for complex grammars. Off-board solutions are "thick" on processing, but the audio quality may be insufficient after network transmission. Therefore two factors must be considered. First, should digital signal processing (DSP) software be provided inside the vehicle to improve audio quality for off-board ASR systems? Second, should the ASR process be split between the vehicle and an off-board server? The latter is usually referred to as distributed voice recognition.

It is possible to provide complete off-board voice services without the requirement of on-board DSP software. Such voice services are in full production today. Although one may oppose "distributed voice recognition", certain on-board software could improve user experience by improving recognition accuracy and barge-in performance. For generating prompts, there is not much to gain by incorporating special on-board software. The biggest issues with prompts are consistency and quality, especially for cases in which text-to-speech is required.

On-board DSP software designed to gain significant improvement in voice recognition performance must accomplish two goals: (1) provide noise cancellation at a stage prior to transmission of the audio signal; and (2) reduce acoustic echo produced within the vehicle to improve barge-in reliability. The first goal refers to improving the quality of the audio signal. Three properties that correlate to audio quality include: bandwidth (sample rate), signal-to-noise ratio (SNR), and signal distortion level. The second goal refers to the problems that occur when trying to talk over prompts generated by in-vehicle speakers that echo back into the hands-free microphone.

Recommendations for on-board software are based on the premise that speech quality significantly impacts recognition accuracy. In particular, speech signals with SNRs below 10 dB are difficult to recognize with high accuracy. In fact, under moderate-to-severe driving conditions, far-field microphones tend to produce audio signals with SNRs below 10 dB. Therefore, on-board software should be designed to improve audio SNR by conditioning the signal to reduce background noise. In terms of audio quality, microphone technology is extremely important, but usually uncontrolled due to OEM cost restrictions. Low-cost microphones are typical in a vehicle environment, which makes software-based noise cancellation desirable.

The concept of distributed voice recognition is to perform the feature extraction process on-board and transmit the feature information (analogous to compressed speech) over the telephone network. One advantage is that a "clean" analog speech signal is processed as though the entire recognizer were on-board. If the compressed representation of the speech signal is digitally transmitted without degradation, then overall recognition accuracy is optimized. In a thin-client context, cost can be another advantage. However, in addition to being a very complex engineering implementation, distributed recognition is disadvantageous because voice recognition algorithms are proprietary to the technology provider. In other words, there are no "standard" front-end processing algorithms.

Microphone placement relative to the user's mouth is one of the most important factors that influence recognition accuracy. Microphone properties themselves certainly play a major role, but proximity to the user's mouth is most important, since spoken speech "fades" relative to background noise as the distance between the microphone and the user's mouth increases. As the fading process occurs, the background noise becomes more dominant relative to speech, which results in lower signal-to-noise ratios (SNRs). In general, accuracy is highly correlated with SNR, and as SNRs approach 0 dB (i.e., speech levels equal background levels), recognition rates degrade severely.

Usability analysis refers to any process that leads to a characterization of human behavior during voice application usage. The primary reason for conducting a usability analysis is to determine all information relevant towards making a better voice user interface. Better user interfaces result from grammar improvements, prompt changes, call flow changes, and other factors that influence user experience. User interface design and enhancement may seem like a "soft" easy science, but in fact, only those experienced in the art of dialogue design truly appreciate the value of usability analysis. There are a variety of methods for analyzing usability. Common usability methodologies include: focus group testing, studying application performance metrics, customer/user surveys, Wizard of Oz testing (simulations of an application without speech technology), and most importantly, listening to recorded calls.

Usability analysis can be used to improve recognition grammars, which ideally model everything a user might say during an application. Usability studies also form the basis for gaining demographic knowledge about the target user population as it applies to improving the "style" or persona of an application.

Improving user interfaces involves studying details of application performance. Application performance can be defined in terms of a number of different components including: call completion rate, recognition accuracy, call duration, operator assistance demand, repeat usage, user frustration, ease-of-use, and penetration rate. Usability analysis identifies areas that need improvement and as appropriate changes are made to applications, performance measurements should show subsequent improvement.

The most significant usability analysis involves listening to recordings of numerous live interactions across a broad range of voice applications. Knowledge gained from such call monitoring and analysis has been directly leveraged to greatly improve application success rates. Such usability analysis expands human factors expertise, which improves application design and therefore voice user interface experience.

A major challenge for user interface design is dealing with out-of-vocabulary (OOV) responses in which the caller says something not in the active recognition grammar. Application acceptance is greatly reduced when OOV responses are consistently misclassified by the recognizer. One good example of an OOV response is coughing while saying a phone number. Ideally, the recognizer ignores the cough and recognizes the phone number, but not always. Another example, is answering a yes/no question with a response that is out of the grammar (such as "I'm not really sure"), which will cause application problems. Asking for help in a way that is not covered by the grammar, such as when a caller says "I need some help" and the system responds by saying "I'm having trouble understanding you," will always cause problems. The examples provided represent real-life user behavior.

Most OOV problems are solvable by expanding grammars in a way that matches expected behavior. Spurious sounds like coughs and loud road noise are managed through parametric adjustments to the recognition engine, which is important, but a complex process that is separate from grammar design. Application success rates improve as OOV is minimized. The strategy should be to use extensive usability analysis to design grammars with the intent of minimizing OOV. Voice applications must handle OOV responses in a user-friendly, acceptable manner. For example, when an OOV response occurs, an appropriate prompt would be "I didn't understand that, your choices are . . . " Grammars should cover expected user responses to the degree that OOV occurrence is low. When OOV responses do occur, the application should prompt the user in an intuitive way with the goal of completing the desired task successfully.

Development of speech technology is becoming more widespread, and therefore there is a significant effort required to develop speech technologies that support multiple languages. Therefore, among the major developers of speech technology, it is common to see product offerings in a wide variety of different languages, with some languages being more developed than others. In addition to limits on the extent of usage of certain languages, and hence limits on the commercial viability of products directed to those languages, some languages are more inherently difficult to model than others.

With the exception of certain tonal languages (e.g., Mandarin and Cantonese), developing a new language involves training a language-agnostic ASR engine with appropriate speech data collected from designated vehicle environments. Speech data is collected to create acoustic models for the target language. Starting from scratch, a new ASR language needs data from about two thousand different speakers. As a rule, the speech data should represent a wide range of accents and environmental conditions.

TTS products also require special development efforts for each language offering (specifically, for each TTS voice). In addition to modeling each new language, acoustic inventories (speech audio collections) are a prerequisite. In contrast to speaker-independent recognition, a new voice for TTS requires a significant amount of speech data from one speaker (as opposed to a population of speakers, needed for ASR).

Relevant to voice telematics and navigation, street name pronunciation databases are commercially available in English, Italian, German, French, Spanish, and British.

These databases facilitate ASR technology and TTS technology for navigation and traffic applications.

In sum, intuitive voice user interfaces provide safety, convenience, and value to the vehicle owner as driver distraction is eliminated. The proliferation of "thin-client" vehicles will open the door to better and new voice telematics services. Embedded voice telematics will converge with off-board voice solutions. Hence, features, such as on-board voice activated user manuals according to the present invention, can be widely realized in the marketplace.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of assisting a vehicle operator in obtaining information about the various systems in a vehicle comprising:
   initiating and establishing a wireless communication link to a remote data center;
   speaking a command into said wireless communication link at the vehicle;
   interpreting said spoken command with a server-based voice recognition system at the remote data center;
   using the recognition output of said voice recognition system to obtain information from a database at said remote data center;
   converting said database information into a computer-generated audio message; and
   transmitting said audio message to the vehicle using said wireless communication link.

2. The method of claim 1, further comprising:
   generating a computer-generated question at the remote data center requesting information from the vehicle operator, and
   transmitting the computer-generated question as an audio message to the vehicle operator via the wireless communications link.

3. The method of claim 2, further comprising:
   generating a voice response to the question from the vehicle operator; and
   transmitting the voice response to the remote data center via the wireless communications link.

4. The method of claim 2, wherein generating a question comprises generating a menu of options for selection by the vehicle operator using a voice interface.

5. The method of claim 1, further comprising transmitting vehicle diagnostic information to the remote data center for obtaining the information from the database.

6. The method of claim 1, further comprising establishing a connection between the vehicle operator and a live operator through the data center and wireless communications link in response to the voice command generated by the vehicle operator.

7. The method of claim 1, further comprising:
   generating a computer generated audio request at the data center requesting that the vehicle operator take certain actions with respect to the vehicle; and
   transmitting the computer-generated audio request to the vehicle operator via the wireless communications link.

8. A system for delivery of a wireless user manual comprising:
   a vehicle unit located on a vehicle operable to:
   establish a wireless communication link to a data center; and
   transmit a user generated voice command via the wireless communications link; and
   a data center linked to the vehicle unit by the wireless communications link and operable to:
   interpret a voice command received via the wireless communications link with a voice recognition system;
   obtain information from a database in response to the interpreted command; convert the database information into a computer-generated audio message; and
   transmit the computer-generated audio message to the vehicle unit using said wireless communication link.

9. The system of claim 8, wherein the vehicle unit comprises a telematics control unit providing diagnostic Information for transmission to the data center via the wireless communications link.

10. The system of claim 9, wherein the telematics unit is further operable to perform in—vehicle tasks in response to user voice commands.

11. The system of claim 8, wherein the data center is further operable to:
    generate a computer-generated question requesting information from the user; and
    transmit the computer-generated question as an audio message to the user via the wireless communications link.

12. The system of claim 8, wherein the data center further comprises a live operator station for communicating with the user in response to a voice command.

13. A vehicle unit for use in a system supporting a hands-free vehicle owner's manual having a data center including a voice recognition system for interpreting received spoken messages, a database including information about features of a vehicle containing the vehicle unit, and a system for converting information retrieved from the database into computer-generated audio messages, the vehicle unit comprising:
    a telematics unit for generating diagnostic messages concerning the associated vehicle; and
    a communications unit for establishing a wireless link with the database for carrying diagnostic and voice messages for interpretation by the voice recognition system of the data center.

14. The vehicle unit of claim 13, further comprising a microphone and speakers for establishing an audible dialog between a vehicle operator and the data center via the wireless data link.

15. The vehicle unit of claim 13, wherein the telematic unit is further operable to control selected vehicle functions in response to voice commands.

* * * * *